(12) United States Patent
Maldener et al.

(10) Patent No.: US 7,528,564 B2
(45) Date of Patent: May 5, 2009

(54) ELECTRICAL MACHINE AND METHOD FOR ADJUSTING AN AXIAL SPACING OF THE ELECTRICAL MACHINE

(75) Inventors: Klaus Maldener, Lauf (DE); Andreas Wehrle, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 11/628,213

(22) PCT Filed: Apr. 14, 2005

(86) PCT No.: PCT/EP2005/051644

§ 371 (c)(1),
(2), (4) Date: Dec. 1, 2006

(87) PCT Pub. No.: WO2005/124977

PCT Pub. Date: Dec. 29, 2005

(65) Prior Publication Data

US 2008/0022783 A1    Jan. 31, 2008

(30) Foreign Application Priority Data

Jun. 18, 2004 (DE) ................. 10 2004 029 535

(51) Int. Cl.
H02K 1/00 (2006.01)
(52) U.S. Cl. .................... 318/539; 318/538; 318/150
(58) Field of Classification Search ................. 318/539, 318/150, 538, 161, 400.4; 310/68; 324/207.25
See application file for complete search history.

(56) References Cited

U.S. PATENT DOCUMENTS

| 4,862,044 A | 8/1989 | Karashima et al. |
| 6,420,865 B1* | 7/2002 | Rettenmeier ........... 324/207.25 |
| 2006/0122028 A1* | 6/2006 | Henzler et al. ................. 476/40 |

FOREIGN PATENT DOCUMENTS

| GB | 2 047 010 A | 11/1980 |
| JP | 55-153261 | 11/1980 |
| JP | 7-274442 | 10/1995 |

* cited by examiner

*Primary Examiner*—Karen Masih
(74) *Attorney, Agent, or Firm*—Ronald E. Greigg

(57) ABSTRACT

An electrical machine including at least one sensor, a transducer wheel at which the sensor axially picks up a signal, an end face of the sensor being adjacent to an annular face on one face end of the transducer wheel, a shaft, on which the transducer wheel is axially displaceably secured, a fixed bearing, and a loose bearing, in which bearings the shaft is supported, and a housing. At least one stop on the machine having at least one stop face that points in the direction of the fixed bearing and has at least one stop face on the transducer wheel, the stop faces being oriented toward one another and axially facing one another. Viewed in the direction of the transducer wheel, the stop faces are designed relative to one another such that the two diametrically opposed active surfaces of the sensor and of the transducer wheel barely do not touch. As a result, the power deviation of the complete electrical machine is reduced due to the minimization of the required axial spacing tolerances between the sensor and the transducer wheel.

20 Claims, 1 Drawing Sheet

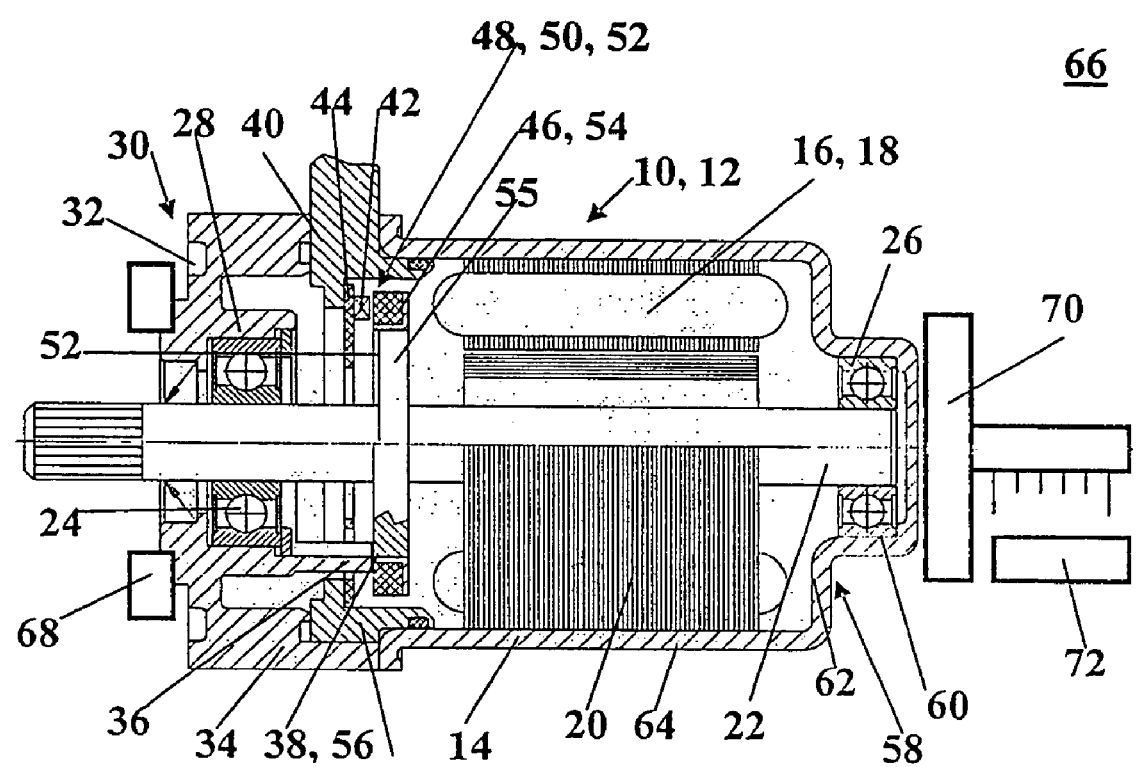

ELECTRICAL MACHINE AND METHOD FOR ADJUSTING AN AXIAL SPACING OF THE ELECTRICAL MACHINE

CROSS-REFERENCE TO RELATED APPLICATION

This application is a 35 USC 371 application of PCT/EP 2005/051644 filed on Apr. 14, 2005.

BACKGROUND OF THE INVENTION

1. Field of the Invention

The invention is based on an electrical machine of the type which includes one sensor, a transducer wheel at which the sensor axially picks up a signal, an end face of the sensor being adjacent to an annular face on one face end of the transducer wheel, a shaft on which the transducer wheel is secured, a fixed bearing, and a loose bearing, in which bearings the shaft is supported, and a housing.

2. Description of the Prior Art

Electrically commutated motors (EC motors) in particular are controlled by way of the sensor-detected signals. To that end, how the sensor system is adapted is decisive with regard to the precision of the commutation times with which the various coils of the stator are switched. Optimal commutation precision is achieved whenever the electronics detect the phase zero crossover of the magnetic flux. Changes in this are expressed as switching errors and cause power distortion of the motor. One often-used sensor system comprises a sensor and a transducer wheel that furnishes the signals for the sensor. To achieve precise switching points, the sensor and the transducer wheel are positioned very close together. In this way, the switching error is reduced. Typically, this is achieved by assembling individual high-precision components. In addition, high-resonance sensor magnets are employed.

It is the object of the invention to create an axial assembly concept with which tolerances in electrical machines, especially EC motors, with axial sensor pickup can be reduced and the machines or motors can be put together with little effort or expense for assembly. The concept should be capable of being used with DC motors with a position detection system as well. This is attained by an electrical machine having the characteristics of claim 1.

SUMMARY OF THE INVENTION

The electrical machine of the invention has the advantage that the power deviation of the complete electrical machine is reduced by minimizing the axial spacing tolerances between the sensor and the sensor magnet.

To that end, an electrical machine, including at least one sensor, a transducer wheel at which the sensor axially picks up a signal, and an end face of the sensor is adjacent to an annular face on one face end of the transducer wheel, a shaft, on which the transducer wheel is secured, a fixed bearing and a loose bearing, in which bearings the shaft is supported, and a housing, and the transducer wheel is axially displaceable on the shaft; at least one stop is provided on the electrical machine and has at least one stop face that points in the direction of the fixed bearing; the transducer wheel likewise has at least one stop face; the stop face of the stop and the stop face of the transducer wheel are oriented toward one another and axially face one another; and the stop face of the stop is aligned axially in the direction of the fixed bearing with the end face of the sensor or protrudes past the end face of the sensor.

This leads to an increased signal precision of the sensor system and as a result to a narrow range of deviation in the power behavior of EC motors and EC generators. It makes it possible to produce components whose dimensional requirements can be less stringent than before, since a dimensional correction is possible during assembly. Moreover, simple assembly processes are the result. Provisions for achieving the function of this invention can easily be incorporated into the construction.

The axial play can be most simply adjusted if the housing has an at least axially elastically deformable region, by way of which the fixed bearing is displaceable with the shaft in the direction of the loose bearing, so that the transducer wheel can be pressed by the stop in the direction of the fixed bearing.

A simple construction is achieved if the stop is provided on a flange of the electrical machine that is remote from the fixed bearing, and the loose bearing is disposed in a bearing seat in the flange, and the stop is preferably embodied on the bearing seat for the loose bearing.

To attain the axially elastic region, the housing is preferably embodied as cup-shaped; the fixed bearing is disposed in the bottom; and the bottom is axially elastically deformable, at least in a disklike region around the fixed bearing.

For the later assembly, it is simplest if the sensor is disposed on an electrical subassembly, which is disposed between the bearings.

A drive unit, in particular for a motor vehicle, such as a steering drive mechanism, power window control, sliding roof drive, drive train pan, or the like, that has such an electrical machine has the further advantage that the power deviation resulting from the assembly process is reduced, and tolerances in the coils, the magnetic remanence, the sensor sensitivity itself, and so forth, are not correctable.

A simple method for adjusting the axial spacing of the electrical machine is obtained by providing that the electrical machine is retained; that a force is exerted on an at least axially elastically deformable region of the housing, so that the fixed bearing with the shaft is displaced in the direction of the loose bearing and the transducer wheel is pressed by at least one stop in the direction of the fixed bearing; and that the force is then withdrawn, as a result of which the axial spacing between the sensor and the transducer wheel is established.

This can furthermore be accomplished if the loose bearing is mounted in a flange and the sensor is mounted in an electrical subassembly; the electrical subassembly is secured to the flange, so that a first preassembled subassembly is formed; the shaft with the transducer wheel is inserted into the housing, so that a second preassembled subassembly is formed; the two preassembled subassemblies are joined to one another; and in the assembly process the transducer wheel rests on the stop.

If the deformation of the housing is displacement-controlled, then the method can easily be implemented in large-scale mass production.

An apparatus for performing the method has a receptacle for the electrical machine, a ram which acts on the housing and exerts the force, and a device for measuring the displacement path of the fixed bearing.

BRIEF DESCRIPTION OF THE DRAWING

One exemplary embodiment is described in further detail herein below, with reference to the sole FIGURE which shows an EC motor in longitudinal section, clamped to an apparatus.

DESCRIPTION OF THE PREFERRED EMBODIMENT

In the drawing, an electrical machine 10 is shown, which is preferably an electronically commutated motor or brushless direct-current motor (DC motor). The electrical machine 10 is part of a drive unit 12 that preferentially finds use in a motor vehicle. The drive unit 12 is a steering drive mechanism, power window controller, sliding roof drive, drive train pan, or the like.

In a cup-shaped housing 14, the electrical machine 10 contains both a stator 18, with a winding 16, and a permanent-magnetically excited rotor 20 for generating the power take-off, such as torque, along with the stator 18. The shaft 22 of the rotor 20 is supported in a loose bearing 24 and a fixed bearing 26, both of which are preferably roller body bearings; the loose bearing 24 may also be embodied as a slide bearing.

The loose bearing 24 is disposed in a bearing seat 28 of a flange 30. The shaft 22 protrudes to the outside from the flange. The flange 30 furthermore serves to flange the electrical machine 10 to a component and also closes off the housing 14. The flange 30 has the shape of a shallow cup, with a bottom 32 on which the bearing seat 28 is embodied and with a rim 34 that is joined to the housing 14. The joining can be done by means of screws, adhesive bonding, roller burnishing, or the like. Ribs 36 protrude from the bearing seat 28 and form a stop. The ribs 36 extend essentially parallel to the shaft 22 and, with stop faces 38, they point in the direction of the fixed bearing 26 that is disposed in the cup-shaped housing 14. The stop faces 38 extend perpendicular to the shaft 22. It is also possible for a single rib 36, for instance an annular rib, to be provided that has recesses on its face end that divide the stop face 38 into a plurality of stop faces 38. However, at least one rib 36 should be provided.

An electrical subassembly 40 is also provided on the flange 30, between the flange and the housing 14. The electrical subassembly 40 includes a stamped grid, not shown, which is embedded in plastic and connects the stator 18—optionally via a controller disposed on the stamped grid—to an external voltage supply. A connection with an external control unit may also be provided, however. A sensor 42, which in the present exemplary embodiment is preferably a Hall sensor, is disposed on the electrical subassembly 40, remote from the flange 30. The sensor 42 is mounted on a printed circuit board 44, which extends perpendicular to the shaft 22. The sensor 42 may, however, also be mounted directly on the stamped grid.

Between the sensor 42 or electrical subassembly 40 and the stator 18, a transducer wheel 46 is secured to the shaft 22, and the sensor 42 picks up a signal axially at this transducer wheel. To that end, an end face 48 of the sensor 42 is disposed adjacent to an annular face 50 on one face end 52 of the transducer wheel 46. The annular face 50 is embodied on a magnet ring 54 of the transducer wheel 46. As a result, the sensor 42 can detect a rotation or the rotary speed of the shaft 22. The magnet ring 54 is seated on a hub 55, which is for instance made of plastic and has an oversize or a press fit on the shaft 22; nevertheless, under force, an axial displacement of the transducer wheel 46 is possible. Besides the annular face 50, a stop face 56 is also provided on the face end 52 of the transducer wheel 46 and is preferably embodied on the hub 55. The stop face 38 of the ribs 36 and the stop face 56 of the transducer wheel 46 are oriented toward one another; that is, the stop face 38 of the ribs 36 points in the direction of the transducer wheel 46. They have the same radial spacing from the shaft 22 and are each located at the same point, as viewed in the circumferential direction of the shaft 22 or of the electrical machine 10, and are therefore axially opposite one another and are indicated in the drawing by a common lead line.

Viewed in the direction of the fixed bearing 26, the stop face 38 of the ribs 36 is designed relative to the stop face 56 of the sensor magnet 54 in such a way that the two opposed active surfaces of the sensor 42 and of the transducer wheel 46 barely do not touch, or have a spacing in the range of a few tenths of a millimeter.

In the bottom 58 of the cup-shaped housing 14, a bearing seat 60 for the fixed bearing 26 is embodied. Surrounding the bearing seat 60, the bottom 58 has a disklike region 62, which is axially elastically deformable. Conversely, the annular wall 64 of the housing 14 is less elastic in response to an axially exerted force.

The electrical machine 10 is clamped into an apparatus 66 shown only symbolically. The apparatus 66 has a receptacle 68 for the electrical machine 10, and preferably the flange 30 is clamped in the receptacle 68. A ram 70 is also provided, which for instance presses against the bearing seat 60 and thus acts on the housing 14 and exerts a force. A device 72 is also provided for measuring the displacement path of the ram 70 or of the fixed bearing 26, and as a result the displacement is displacement-controlled.

Before the electrical machine 10 is clamped to the apparatus 66, the loose bearing 24 is mounted in the flange 30. The sensor 42 is disposed on the electrical subassembly 40. After that, the electrical subassembly 40 is secured to the flange 30. This creates a first preassembled subassembly. The shaft 22 with the transducer wheel 46 is inserted into the housing 14, creating a second preassembled subassembly. The transducer wheel 46 is mounted on the shaft 42 in such a way that upon being joined together it touches the ribs 36. Then the two preassembled subassemblies are braced to one another. As a result, the transducer wheel 46 and the ribs 36 are under an initial tension. It can also happen, when the two preassembled subassemblies are braced to one another, that the transducer wheel 46 is displaced by the ribs 36 in the direction of the fixed bearing 26.

If the electrical machine 10 is then retained on the apparatus 66, pressure is exerted on the bearing seat 60 with the ram 70. As a result, a force is exerted on the axially elastically deformable region 62 of the housing 14, and as a result the fixed bearing 26 with the shaft 22 is displaced in the direction of the loose bearing 24. In the process, the transducer wheel 46 is pressed farther in the direction of the fixed bearing 26 by the ribs 36. If the force is withdrawn by retraction of the ram 70, the elastic part of the bottom 58 rebounds, and as a result the axial spacing between the sensor 42 and the transducer wheel 46 is established. It is thus possible to keep the spacing between the sensor 42 and the annular face 50 or the sensor magnet surface as small as possible.

For the sake of process costs in large-scale mass production, assembly units are typically mounted in displacement-controlled fashion. Accordingly, the individual tolerances of the components of the two preassembled subassemblies would have a major effect on the spacing tolerance between the sensor 42 and the annular face 50 or the sensor magnet surface. Because the second preassembled subassembly (the transducer wheel 46 on the rotor 20) is displaceable in the assembly process, the chain of tolerances from the housing 14 via the fixed bearing to the transducer wheel 46 is eliminated. The greatest tolerance influence in the entire construction is now due only to the dimensional construction between the end face of the sensor 42 on the electrical subassembly 40 and the stop face 38 of the ribs 36 on the flange 30. However, this can be limited to a minimum by means of an adapted chain of the dimensioning of the individual parts.

The tolerance makeup of the first preassembled subassembly, that is, the flange 30 with the electrical subassembly 40, is selected such that the stop faces 38 of the ribs 36 protrude at least as far as the end face 48 of the sensor 42, so that a maximum assembly pressure of the transducer wheel 46 can be diverted to the flange 30 via the ribs 36.

The second preassembled subassembly, the transducer wheel 46 with the housing 14, rotor 20, and stator 18, is constructed such that in the assembly process, the transducer wheel 46 is displaced axially in the direction of the fixed bearing 26 by the ribs 36 on the flange 30.

Naturally, a plurality of sensors 42 may be provided, instead of the one sensor 42 shown.

The foregoing relates to a preferred exemplary embodiment of the invention, it being understood that other variants and embodiments thereof are possible within the spirit and scope of the invention, the latter being defined by the appended claims.

The invention claimed is:

1. An electrical machine comprising at least one sensor, a transducer wheel at which the sensor axially picks up a signal, the sensor having an end face disposed adjacent to an annular face on one face end of the transducer wheel, a shaft on which the transducer wheel is secured, a fixed bearing and a loose bearing in which bearings the shaft is supported, a housing, the transducer wheel being axially displaceable on the shaft; at least one stop on the electrical machine, the at least one stop having at least one stop face that points in the direction of the fixed bearing; and at least one stop face on the transducer wheel, the at least one stop face of the stop and the at least one stop face of the transducer wheel being oriented toward one another and being axially diametrically opposed and the stop face of the stop being aligned axially in the direction of the fixed bearing with the end face of the sensor or protruding past the end face of the sensor.

2. The electrical machine as defined by claim 1, wherein the housing comprises an at least axially elastically deformable region, by way of which the fixed bearing is displaceable with the shaft in the direction of the loose bearing whereby the transducer wheel can be pressed by the stop in the direction of the fixed bearing.

3. The electrical machine as defined by claim 1, wherein the transducer wheel comprises an axial fixed seat with the shaft and can be displaced with expenditure of axial force and in electrical machine operation remains fixedly connected to the shaft.

4. The electrical machine as defined by claim 2, wherein the transducer wheel comprises an axial fixed seat with the shaft and can be displaced with expenditure of axial force and in electrical machine operation remains fixedly connected to the shaft.

5. The electrical machine as defined by claim 1, wherein the stop is provided on a flange of the electrical machine that is remote from the fixed bearing; and wherein the loose bearing is disposed in a bearing seat in the flange and the stop is preferably embodied on the bearing seat for the loose bearing.

6. The electrical machine as defined by claim 2, wherein the stop is provided on a flange of the electrical machine that is remote from the fixed bearing; and wherein the loose bearing is disposed in a bearing seat in the flange and the stop is preferably embodied on the bearing seat for the loose bearing.

7. The electrical machine as defined by claim 3, wherein the stop is provided on a flange of the electrical machine that is remote from the fixed bearing; and wherein the loose bearing is disposed in a bearing seat in the flange and the stop is preferably embodied on the bearing seat for the loose bearing.

8. The electrical machine as defined by claim 1, wherein the housing is embodied as cup-shaped; wherein the fixed bearing is disposed in the bottom of the cup shaped housing; and wherein the bottom is axially elastically deformable, at least in a disklike region around the fixed bearing.

9. The electrical machine as defined by claim 2, wherein the housing is embodied as cup-shaped; wherein the fixed bearing is disposed in the bottom of the cup shaped housing; and wherein the bottom is axially elastically deformable, at least in a disklike region around the fixed bearing.

10. The electrical machine as defined by claim 3, wherein the housing is embodied as cup-shaped; wherein the fixed bearing is disposed in the bottom of the cup shaped housing; and wherein the bottom is axially elastically deformable, at least in a disklike region around the fixed bearing.

11. The electrical machine as defined by claim 5, wherein the housing is embodied as cup-shaped; wherein the fixed bearing is disposed in the bottom of the cup shaped housing; and wherein the bottom is axially elastically deformable, at least in a disklike region around the fixed bearing.

12. The electrical machine as defined by claim 1, wherein the housing comprises a region that is elastic in the axial direction, as a result of which the fixed bearing with the shaft can be axially elastically moved.

13. The electrical machine as defined by claim 8, wherein the housing comprises a region that is elastic in the axial direction, as a result of which the fixed bearing with the shaft can be axially elastically moved.

14. The electrical machine as defined by claim 1, wherein the sensor is disposed on an electrical subassembly disposed between the fixed and loose bearings.

15. The electrical machine as defined by claim 5, wherein the sensor is disposed on an electrical subassembly disposed between the fixed and loose bearings.

16. A method for adjusting an axial spacing of the electrical machine as defined by claim 6, the method comprising retaining the electrical machine, exerting a force on the at least axially elastically deformable region of the housing so that the fixed bearing with the shaft is displaced in the direction of the loose bearing and the transducer wheel is pressed by at least one stop in the direction of the fixed bearing, and withdrawing the force to thereby establish the axial spacing between the sensor and the transducer wheel.

17. The method as defined by claim 16, further comprising mounting the loose bearing in a flange and mounting the sensor in an electrical subassembly, securing the electrical subassembly to the flange to form a first preassembled subassembly, inserting the shaft with the transducer wheel into the housing to form a second preassembled subassembly, and joining the two preassembled subassemblies to one another so that in the assembly process the transducer wheel rests on the stop.

18. The method as defined by claim 16, wherein the deformation of the housing is displacement-controlled.

19. An apparatus for performing the method as defined by claim 16, the apparatus comprising a receptacle for the electrical machine, a ram which acts on the housing to exert the force, and a device for measuring the displacement path of the fixed bearing.

20. A drive unit for a motor vehicle component, comprising an electrical machine, the electrical machine comprising at least one sensor, a transducer wheel at which the sensor axially picks up a signal, of the sensor having an end face disposed adjacent to an annular face on one face end of the transducer wheel, a shaft on which the transducer wheel is secured, a fixed bearing and a loose bearing in which bearings the shaft is supported, a housing, the transducer wheel being axially displaceable on the shaft; at least one stop on the electrical machine, the at least one stop having at least one stop face that points in the direction of the fixed bearing; and at least one stop face on the transducer wheel, the at least one stop face of the stop and the at least one sop face of the transducer wheel being oriented toward one another and being axially diametrically opposed and the stop face of the stop being aligned axially in the direction of the fixed bearing with the end face of the sensor or protruding past the end face of the sensor.

* * * * *